United States Patent [19]

Reid et al.

[11] 4,056,856
[45] Nov. 8, 1977

[54] WATER SAVER

[76] Inventors: John Reid, 2704 Eric Court, Bakersfield, Calif. 93306; Walter W. Stiern, 2901 Skyline Blvd., Bakersfield, Calif. 93305

[21] Appl. No.: 684,485

[22] Filed: May 10, 1976

[51] Int. Cl.² .................... E03D 1/22; E03D 5/09; G05G 1/10
[52] U.S. Cl. ........................ 4/67 A; 74/543
[58] Field of Search .................. 4/34, 37, 57 P, 57 R, 4/67 R, 67 A; 74/543, 548, 567

[56] References Cited
U.S. PATENT DOCUMENTS

| 1,960,864 | 5/1934 | Brown | 4/67 A |
| 2,237,294 | 4/1941 | Easley | 4/37 |
| 2,505,091 | 4/1950 | Brebis | 4/67 A |
| 3,091,775 | 6/1963 | Himmelrick | 4/67 A |
| 3,487,476 | 1/1970 | Stiern et al. | 4/67 R X |
| 3,795,016 | 3/1974 | Eastman | 4/67 R X |

Primary Examiner—Richard E. Aegerter
Assistant Examiner—Stuart S. Levy

[57] ABSTRACT

An apparatus for selectively providing either a full flush or a partial flush of water from the reservoir of a toilet has a standpipe with discharge valves at two different levels. There is a lever for each valve manipulated by a single handle and shaft. The shaft, when rotated in one direction to lift either one of the levers, slides freely with respect to the other lever so that the other lever is undisturbed.

8 Claims, 8 Drawing Figures

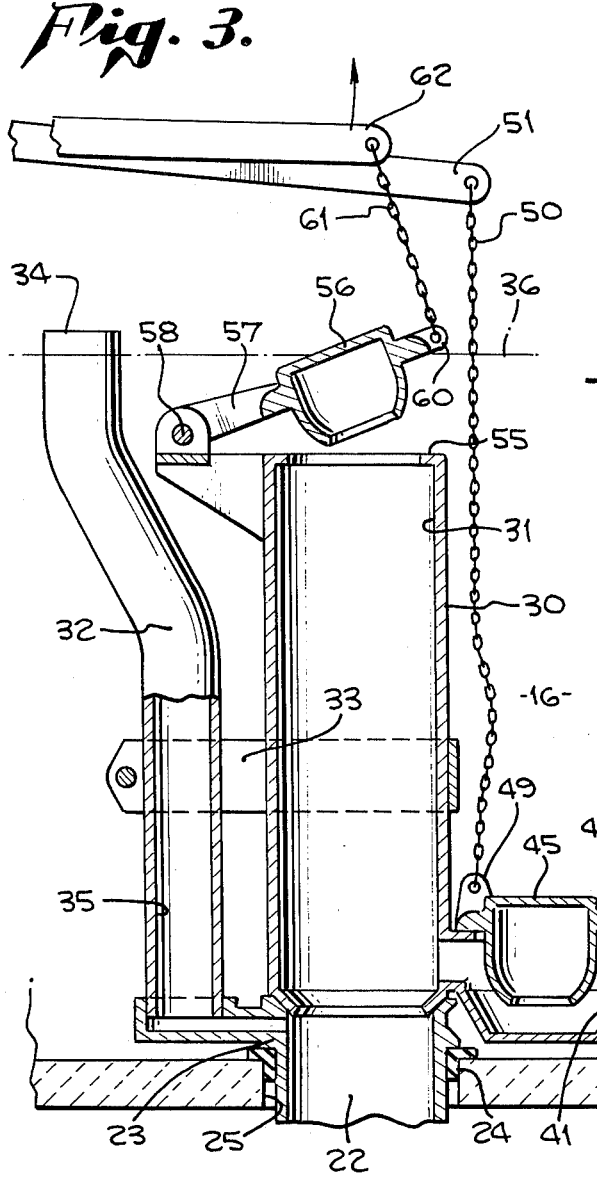
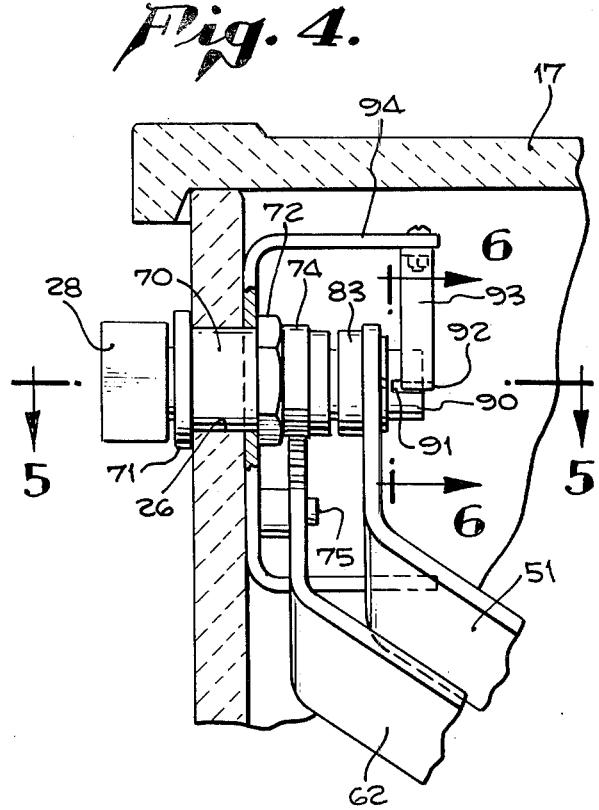
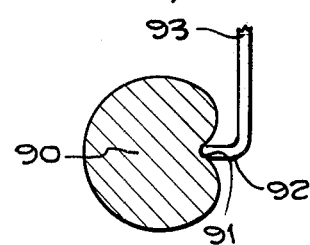
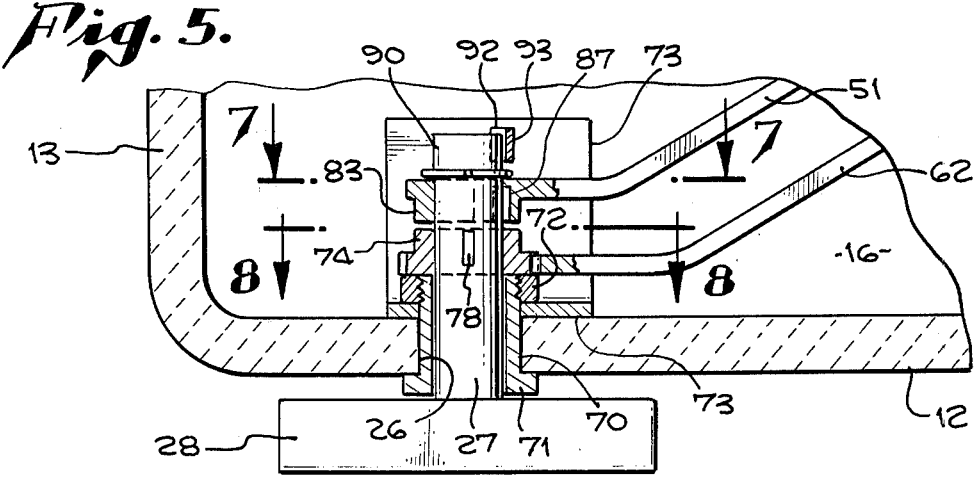

WATER SAVER

Seasons of the year frequently occur when water becomes scarce either for lack of rainfall or extra heavy use. Some portions of the country suffer a chronic shortage of water. Moreover, irrespective of water shortages, water is often wasted when more of it is used than may be needed for some particular function such as the flushing of a conventional toilet by use of a flush tank full of water provided with mechanisms requiring that the entire contents be discharged at each use irrespective of need.

Various expedients have been proposed to provide what may commonly be termed as a half flush from a tank full of water. Such expedients have included providing a dam in the chamber of the tank dividing the tank into two chambers, one only of which need be flushed for a half flush operation or both of which may be flushed for a full flush operation, as is proposed in U.S. Pat. No. 3,487,476.

Other expedients have also been tried as for example the design and building of a handle mechanism of such character that the discharge valve is lifted only long enough to flush a portion of the tank when a portion only is sufficient but wherein related mechanical means can be manipulated to discharge the full capacity of the tank.

Although concededly present-day technology is capable of providing diverse valving for the selective discharge of a liquid reservoir in the control of toilet flush valve tanks it must be borne in mind that millions of such tanks are already in existence and that for effective water saving a water saving mechanism must be one capable of installation in the average household flush tank, without necessitating any appreciable change. It is also important that the selective flushing mechanism be one of relatively simple character capable of being installed by persons of no more than modest capability and must also be one which is sufficiently simple in its construction and operation to be sold economically and to function uninterruptedly for long periods of time without servicing.

It is therefore among the objects of the invention to provide a new and improved water saver for toilet flush tanks which, by a simple expedient, can be manipulated to discharge either a tank full of water or some selected partial quantity of water depending on a particular need.

Another object of the invention is to provide a new and improved water saver for toilet flush tanks which can be easily and successfully manipulated from the exterior of the tank to the extent that the direction of rotation of the handle alone serves to provide either a full flush or a partial flush of the tank.

Still another object of the invention is to provide a new and improved water saver for toilet flush tanks, the parts of which can be readily substituted for conventional mechanisms already installed in such flush tanks without need for either structural or plumbing changes other than mere replacement of the water saver mechanism for mechanism already installed.

Still further among the objects of the invention is to provide a sure, adequate, dependable and inexpensive means of making possible in the alternative either a partial discharge or full discharge of the contents of a flush tank which is operable in a sufficiently conventional manner to accommodate refilling of the tank by the same means now employed and in the same short space of time.

With these and other objects in view, the invention consists in the construction, arrangement, and combination of the various parts of the device, whereby the objects contemplated are attained, as hereinafter set forth, pointed out in the appended claims and illustrated in the accompanying drawings.

In the drawings:

FIG. 3 is a fragmentary longitudinal sectional view on the line 3—3 of FIG. 1;

FIG. 4 is a fragmentary transverse sectional view on the line 4—4 of FIG. 1;

FIG. 5 is a fragmentary horizontal sectional view on the line 5—5 of FIG. 4;

FIG. 6 is a fragmentary longitudinal sectional view on the line 6—6 of FIG. 4;

Figure 1:
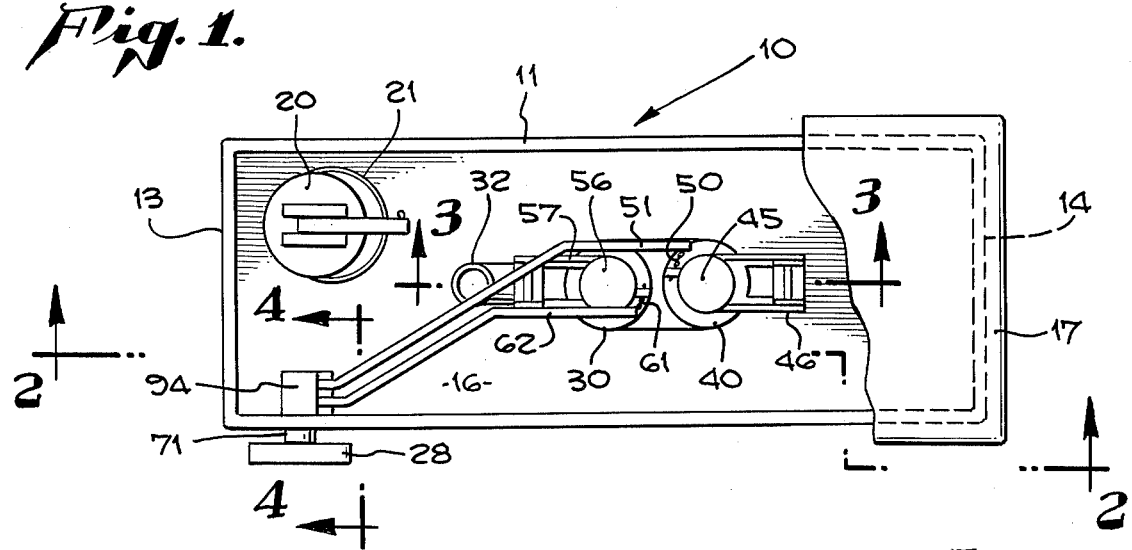
FIG. 1 is a plan view of a flush tank showing the installation of the water saver of the invention.

In an embodiment of the invention chosen for the purpose of illustration there is shown a tank indicated generally by the reference character 10 consisting of side walls 11 and 12, end walls 13 and 14 and a bottom 15 which enclose a reservoir 16. The customary cover 17 rests on top edges of the walls. A supply pipe 18 provides water to replenish the reservoir which flows upwardly through a riser 19, admission of which is controlled by a float valve device 20 subject to action of a float 21. The customary discharge pipe 22 is fastened by means of a fitting 23 and seal 24 in an opening 25 in the bottom 15 of the tank. A handle aperture 26 accommodates a shaft 27 of a handle 28. The parts described are those parts customarily embodied in toilet flushed tanks virtually standard throughout the United States numbering many millions.

The invention is to a large degree embodied in a standpipe 30 which is mounted in the fitting 23 as shown in FIG. 3 and which provides a passage 31 to the discharge pipe 22. An overflow pipe 32 is attached by means of a bracket 33 to the standpipe 30 and provides overflow from a top end 34 through an overflow passage 35 to the fitting 23 and thus to the discharge pipe 22. Although action of the float control valve 20 is depended upon normally to determine an upper level 36 of the reservoir 16 should the float control valve not function properly, the upper level cannot exceed the level of the top end 34 of the overflow pipe 32.

Figure 2:
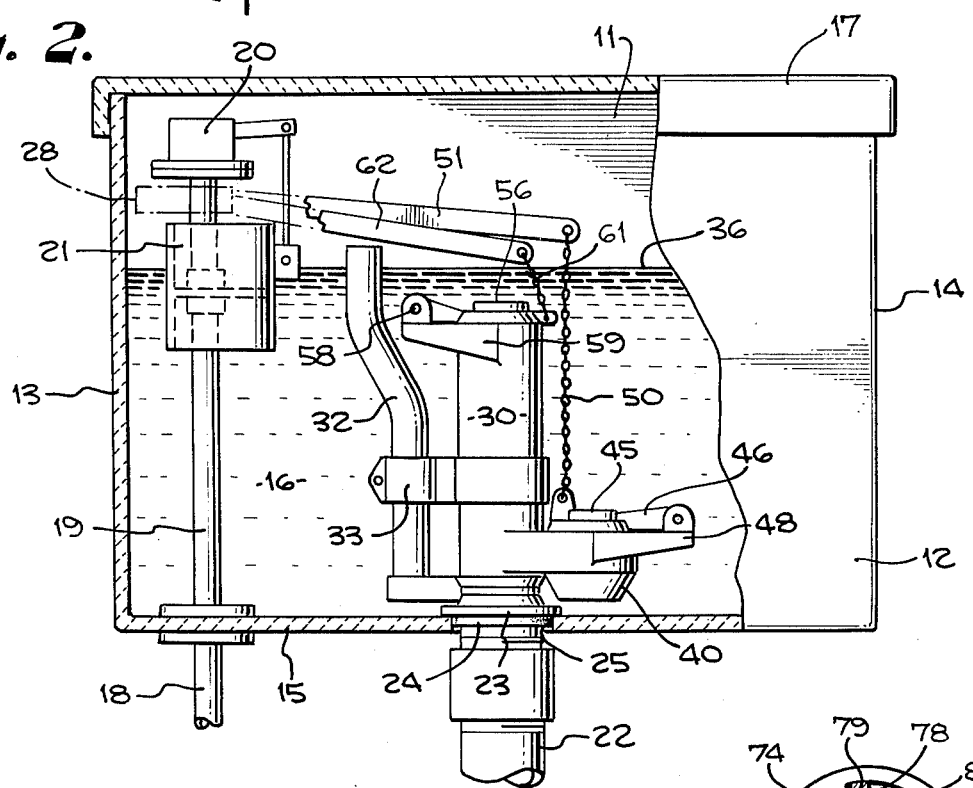
FIG. 2 is a longitudinal sectional view on the line 2—2 of FIG. 1.

Adjacent the lower end of the standpipe 30 there is provided a fitting 40 which extends laterally outwardly as shown in FIGS. 2 and 3, the fitting providing a flush valve chamber 41 which communicates through an orifice 42 with the passage 31. A valve seat 43 has seated thereon an annular valve element 44 which is carried by a substantially conventional ball valve discharge member 45. The ball valve is at the end of an arm 46 pivotally mounted by a pin 47 at the outer end of an extension 48, in turn carried by the fitting 40. A tab 49 has attached thereto a chain 50 which extends downwardly from the end of a full flush lever 51. At the upper end of the standpipe 50 there is provided a flange forming an annular valve seat 55 for the accommodation of a partial flush ball valve discharge member 56.

The ball valve is provided with an arm 57 attached by means of a pivot pin 58 to the outer end of an extension 59 at the top of the standpipe 30. A tab 60 provides means for attaching a chain 61 which depends from the outer end of a partial flush lever 62.

For manipulation selectively of the full flush lever and partial flush lever a special mechanism is incorporated in the handle 28 and its accompanying shaft 27 so that rotation in one direction results in a full flush of the entire contents of the reservoir 16 and rotation in the opposite direction results in a partial flush using only part of the water in the reservoir 16.

Figure 7:
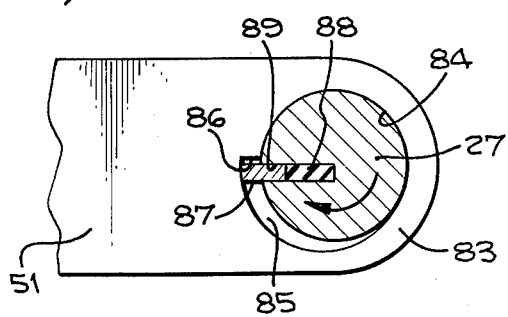
FIG. 7 is a fragmentary longitudinal sectional view on the line 7—7 of FIG. 5.
Figure 8:
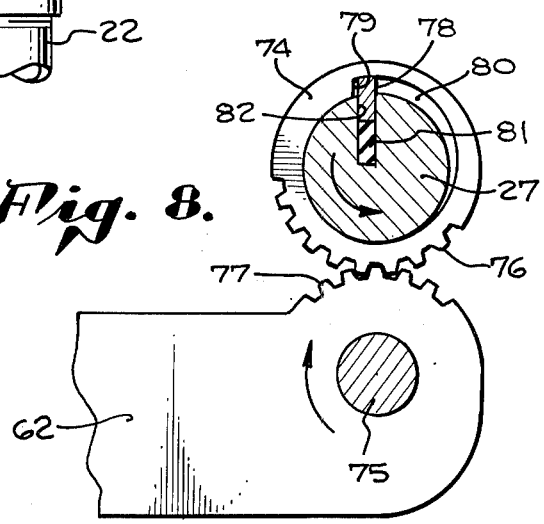
FIG. 8 is a fragmentary longitudinal sectional view on the line 8—8 of FIG. 5.

As shown more particularly in FIGS. 5, 7 and 8, the shaft 27 is retained in the handle aperture 26 by employment of a sleeve 70, a flange 71 which is drawn snugly against the side wall 12 of the tank by means of a nut 72, the nut in turn being drawn against a U-shaped bracket 73.

Mounted on the shaft 27 is a separate sleeve 74 which is adapted to cooperate with and manipulate the partial flush lever 62, acting through a gear drive as shown in FIG. 8. The partial flush lever 62 for this purpose is separately pivoted on a pin 75 on the U-shaped bracket 73. Gear teeth 76 on the sleeve 74 mesh with gear teeth 77 at the pivoted end of the partial flush lever throughout an angular distance sufficient to raise the lever 62 from the lowered position shown in FIG. 2 to the upper position shown in FIG. 3. The partial flush ball valve 56 is lifted from its seat pivoting about the pin 58. This results in a dumping of part of the contents of the reservoir 16 into the passage of 31 for a partial flush. Only that portion of the reservoir between the top of the standpipe 30 and the upper level 36 of the reservoir is used during this partial flush.

To manipulate the handle 28 for a partial flush the handle is rotated clockwise as viewed from the front of the tank as pictured in FIGS. 1 and 5 which means that, as viewed in FIG. 8, the shaft 27 is rotated in a counterclockwise direction. Rotation of the shaft 27 as described brings the projecting end of a radially retractable key 78 against a shoulder 79 of the sleeve 74, the rotation of which acting through the gear drive elevates the outer end of the partial flush lever 62. Adjacent the shoulder 79 is a space 80 which is the result of the eccentric character of the central passage through the sleeve 74, the space being one diminishing progressively from a full height adjacent the shoulder 79 to zero at a location something less than about 180° removed. A resilient member 81 such for example as a rubber plug in the bottom of a radially extending recess 82 serves normally to urge the key 78 to extended position as shown in FIG. 8. Rotation of the shaft 27 in an opposite or clockwise direction as viewed in FIG. 8 creates no rotating motion in the sleeve 74 because the key 78 merely slides in the space 80 and is pushed progressively into the recess 82 by reason of the progressively diminishing curvature of the wall of the recess 80. Rotation in that direction leaves the partial flush lever 62 in its normal lowered position.

For lifting the full flush lever 51 the lever is provided with a captive sleeve or flange 83 which surrounds the innermost end of the shaft 27 as shown in FIGS. 4 and 5 and again in FIG. 7. An opening 84 in the captive sleeve 83 is eccentric which results in the provision of a space 85 at the end of which is a shoulder 86, the space diminishing progressively in size from the shoulder to a point something less than about 180° removed. The outer end of the key 87 is adapted to bear against the shoulder 86 when urged outwardly by operation of a resilient member 88 within a radially extending recess 89.

By reason of the structure just described, when the handle 28 is rotated counterclockwise as viewed in FIGS. 1 and 3, meaning that the shaft 27 is rotated clockwise as viewed in FIG. 7, the key 87 is pressed against the shoulder 86 causing the full flush lever 51 to be elevated from the position shown in FIGS. 2 and 3 to an upper position wherein the full flush ball valve 45 is unseated. When this occurs the full contents of the reservoir 16 is discharged through the chamber 41 and into the bottom of the standpipe 30 from which it passes through the discharge pipe 22.

As the shaft 27 is rotated clockwise as shown in FIG. 7, which means also clockwise as shown in FIG. 8, the partial flush lever 62 remains undisturbed because of presence of the space 80 adjacent the key 78.

Conversely when, as previously described, the shaft 27 is rotated clockwise as shown in FIGS. 7 and 8 to manipulate the partial flush lever 62, the key 87 travels through the adjacent space 85 and is progressively pushed into the recess 89 against tension of the resilient member 88, the action of which permits the full flush lever 51 to remain in horizontal non-operating position when the partial flush lever 62 is lifted.

As an additional convenience there is attached at the inner end of the shaft 27 a block 90, the location of which is shown in FIG. 5 and the cross-sectional configuration of which is shown in FIG. 6. The block 90 can be made as an integral part of the shaft 27 so as to rotate with the shaft on all occasions. In the circumference of the block 49 is a depression 91 which receives a leg 92 of a temporary detent arm 93, the detent arm being attached to a leg 94 of the U-shaped bracket 73. The resilient character of the detent arm causes the leg 92 to be pressed into the depression when the handle 28 is at neutral position, namely a position with both ball valves closed.

It will be apparent from the foregoing description that the novel water saver mechanism is one capable of being installed in subtantially conventional flush tanks and made to operate with a handle mechanism which is installed in the conventional hole customarily supplied for handle manipulation of virtually all those mechanisms currently in use. The ball flush valves operate on a well understood principle and accordingly present no special problem in installation, service and maintenance. The ball valves are, however, uniquely located on a common riser and the special structure cooperating with the shaft 27 makes it possible for the operator to very simply select either a full flush or partial flush operation merely by way of rotating the handle in one direction or the other, the direction of which can be marked on the handle itself. To return one or another of the ball valves to initial position all that is necessary is for the operator to release the handle, whereupon the tank refills in the customary manner.

Having described the invention, what is claimed as new in support of Letters Patent is as follows:

1. In a flush tank which has a chamber for water, a float controlled inlet valve and a flush outlet, a flush mechanism comprising a standpipe at the outlet, having a low level discharge passageway, a high level passageway, and a valve element for each passageway, a full flush lever having a captive end means mounted on the flush tank with a free end attached to the low level valve element and a partial flush lever having a captive end means pivotally mounted on the flush tank with a free end attached to the high level valve element, an operating shaft having a pivotal mounting on said flush tank and a handle, a positive drive between said shaft and said full flush lever and a free sliding engagement with said partial flush lever during rotation of said shaft in one direction, said shaft having in the opposite, rotational direction a positive drive with the partial flush lever and a free sliding engagement with the full flush lever, a radially retractable key means on the shaft, the captive end means of one of said levers having a shoulder and an adjacent space with the shoulder facing one side of the key means, the captive end means of the other of said levers having a shoulder and adjacent space with the shoulder facing the opposite side of the key means whereby rotation of the shaft in one direction operates one only of said levers and in the other direction only the other of said levers.

2. A flush mechanism as in claim 1 wherein the low level discharge passageway includes a fitting extending radially outwardly from the standpipe with an upwardly facing discharge orifice and valve seat.

3. A flush mechanism as in claim 1 wherein the high level discharge passageway comprises an upper end opening of the standpipe.

4. A flush mechanism as in claim 1 wherein the space in each captive end means has a depth diminishing progressively from a location adjacent the shoulder to a location about 180° therefrom.

5. A flush mechanism as in claim 1 wherein the captive end means of one of said levers comprises a separate pivot shaft for the lever, a sleeve around the shaft and a gear drive between the sleeve and the lever.

6. A flush mechanism as in claim 1 wherein said key means comprises projection and resilient elements in engagement with the projection, there being a radially extending recess in the shaft receptive of said projection and resilient elements.

7. A flush mechanism as in claim 6 wherein said key means comprises a projection element and a corresponding resilient element for each lever.

8. A flush mechanism as in claim 1 wherein there are temporary detent elements acting between the shaft and the tank, said detent elements being in rotation restraining engagement when the shaft is at intermediate position.

* * * * *